(12) United States Patent
Takata

(10) Patent No.: US 7,051,133 B2
(45) Date of Patent: May 23, 2006

(54) ARBITRATION CIRCUIT AND DATA PROCESSING SYSTEM

(75) Inventor: Yukari Takata, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 225 days.

(21) Appl. No.: 10/603,809

(22) Filed: Jun. 26, 2003

(65) Prior Publication Data

US 2004/0117527 A1 Jun. 17, 2004

(30) Foreign Application Priority Data

Nov. 25, 2002 (JP) .............................. 2002-340732

(51) Int. Cl.
*G06F 13/14* (2006.01)
*G06F 13/36* (2006.01)

(52) U.S. Cl. .................... 710/111; 710/113; 710/116; 710/241; 710/243; 710/244

(58) Field of Classification Search ................ 710/240, 710/241, 243, 244
See application file for complete search history.

(56) References Cited

U.S. PATENT DOCUMENTS

| | | | | |
|---|---|---|---|---|
| 5,274,822 A * | 12/1993 | Stanton et al. | ............... | 710/244 |
| 5,463,624 A * | 10/1995 | Hogg et al. | ................. | 370/461 |
| 5,784,590 A * | 7/1998 | Cohen et al. | ............... | 711/122 |
| 5,862,353 A * | 1/1999 | Revilla et al. | ............... | 710/107 |
| 5,870,560 A * | 2/1999 | Zulian | ......................... | 709/225 |
| 5,884,051 A * | 3/1999 | Schaffer et al. | ............. | 710/107 |
| 5,913,045 A * | 6/1999 | Gillespie et al. | ............ | 710/311 |
| 6,393,506 B1 * | 5/2002 | Kenny | ......................... | 710/113 |
| 6,633,939 B1 * | 10/2003 | Butta' et al. | ................. | 710/244 |
| 6,647,449 B1 * | 11/2003 | Watts | ......................... | 710/111 |
| 6,704,821 B1 * | 3/2004 | Scandurra et al. | .......... | 710/243 |
| 6,880,028 B1 * | 4/2005 | Kurth | ......................... | 710/240 |

FOREIGN PATENT DOCUMENTS

| | | | |
|---|---|---|---|
| JP | 1-97865 | | 8/1989 |
| JP | 01200439 A | * | 8/1989 |
| JP | 4-328665 | | 11/1992 |
| JP | 10-91577 | | 4/1998 |

* cited by examiner

*Primary Examiner*—Paul R. Myers
*Assistant Examiner*—Ryan Stiglic
(74) *Attorney, Agent, or Firm*—Oblon, Spivak, McClelland, Maier & Neustadt, P.C.

(57) ABSTRACT

An arbitration circuit and a data processing system which ensure fair bus access are provided. An arbitration circuit (1) has a priority check block (21) and a round robin block (22). The priority check block (21) checks pieces of priority information provided from processors, specifies a processor that is presenting priority information with the highest priority, i.e. a processor with the highest priority level, and outputs the result of the check (CHK) to the round robin block (22). The round robin block (22), holding the results of the previous arbitration process, generates and outputs a processor selecting signal (SE) on the basis of the priority check result (CHK) and a round robin order generated from the previous results.

15 Claims, 10 Drawing Sheets

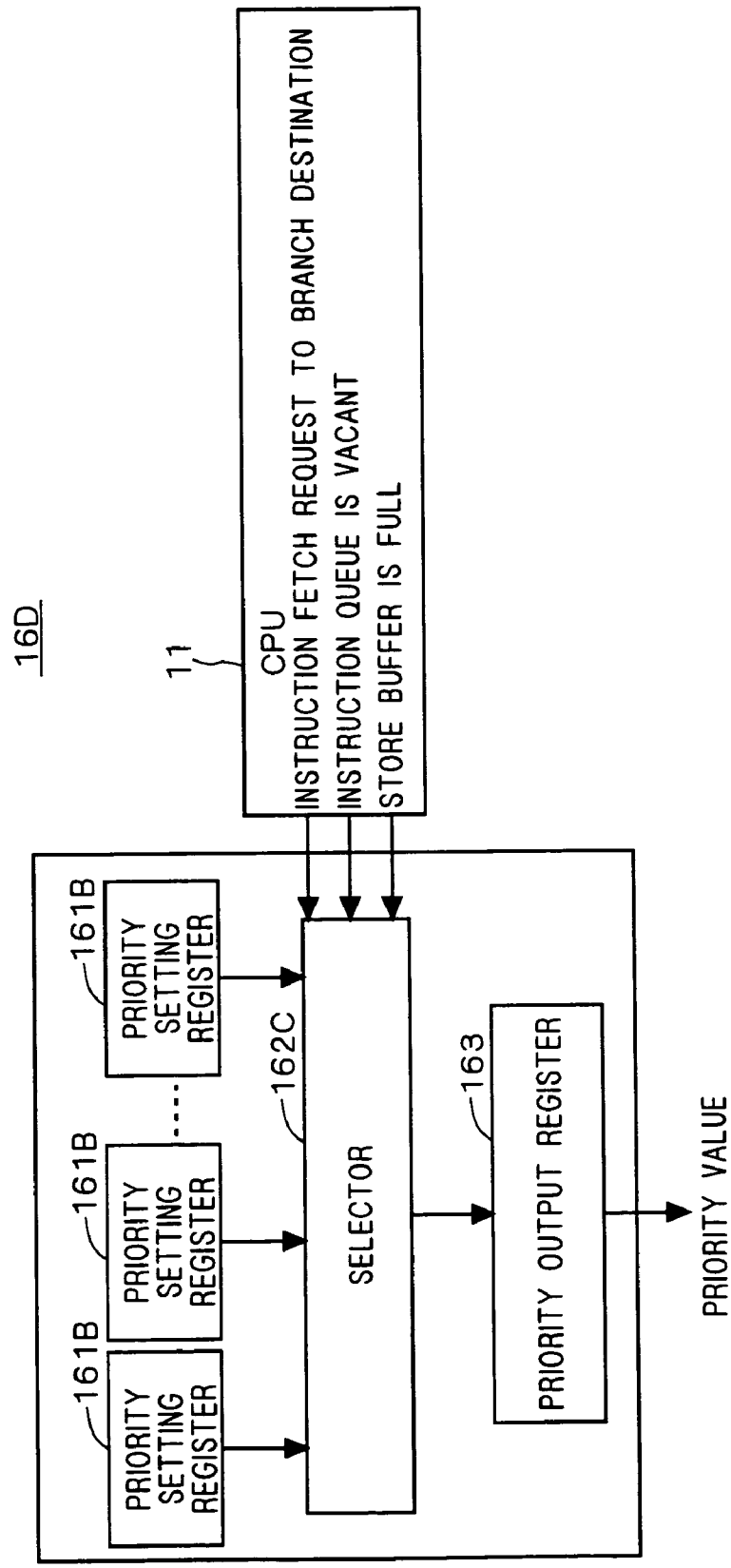

ARBITRATION CIRCUIT AND DATA PROCESSING SYSTEM

BACKGROUND OF THE INVENTION

1. Field of the Invention

The present invention relates to arbitration circuits for arbitrating among bus access requests in data processing systems having a plurality of bus masters connected through a shared bus, and particularly to an arbitration circuit used in a multiprocessor in which a plurality of processors are connected through a shared bus.

2. Description of the Background Art

When a plurality of I/O modules share a common bus, a method called "round robin" is adopted to arbitrate bus access from the I/O modules.

Round robin control assigns the lowest access priority to an I/O module that was granted bus access, so that the I/O modules have equal opportunity for bus access.

As for conventional techniques using the round robin control, Japanese Patent Application Laid-Open No. 10-91577 (1998), columns 3 to 11, FIGS. 1 to 3 (Patent Document 1) discloses a scheme combining priority control and round robin control, where access is allowed in accordance with the importance levels of I/O modules.

Japanese Patent Application Laid-Open No. 4-328665 (1992), pp. 4 to 6, FIGS. 1 to 3 (Patent Document 2) also discloses a combination of priority control and round robin control, where each processor is provided with two kinds of priorities and the highest-priority processor is determined in accordance with combinations of the two kinds of priorities.

Further, Japanese Patent Application Laid-Open No. 1-197865 (1989), pp. 3 to 5, FIGS. 1 to 6 (Patent Document 3) discloses a technique in which, when bus access from a module with a low priority is rejected, the time is measured so as to preferentially grant bus access to that module if that module is not awarded access for a predetermined time period or longer.

Common round robin control schemes accept any requests from I/O modules in order, regardless of the contents of the requests, without distinguishing between important requests for system operation and requests that may be nullified, such as instruction prefetch requests (pre-reads of data). On the other hand, Patent Documents 1 to 3 disclose examples incorporating control schemes that consider priority as well. However, these techniques may fail to provide fair bus access because I/O modules with low priorities may be left without being awarded any opportunity for bus access.

SUMMARY OF THE INVENTION

An object of the present invention is to provide an arbitration circuit and a data processing system that can ensure fair bus access.

A first aspect of the present invention is intended for an arbitration circuit for arbitrating bus access requests presented from a plurality of bus masters connected through a shared bus. The arbitration circuit includes a priority check block and a round robin block. The priority check block receives multiple pieces of priority information outputted respectively from the plurality of bus masters, and compares the pieces of priority information and specifies masters with a highest priority so as to output a check result. The round robin block includes: a round robin control unit for determining, through round robin control, a priority order of the bus access requests from the plurality of bus masters; a round robin masking unit for masking data of the check result with mask data to output a masked check result, the mask data being generated on the basis of the priority order and leaving unmasked the data at least about a highest-priority master; and a final selection unit for selecting a bus master whose bus access request should be accepted on the basis of the masked check result and the check result.

The arbitration circuit shown above includes a priority check block and a round robin block, thereby combining priority arbitration and round robin arbitration. Thus, while giving the bus access right preferentially to a bus master presenting a high-priority bus access request, the arbitration circuit masks the check result data with mask data generated on the basis of a round robin order so that the data at least about a highest-priority bus master is kept unmasked, and provides a masked check result. Some priority information is thus invalidated and the influence of the priority information is reduced or eliminated, and arbitration ensuring bus access fairness is provided.

A second aspect of the invention is intended for a data processing system having an arbitration circuit that receives multiple pieces of priority information outputted respectively from a plurality of bus masters connected through a shared bus, so as to arbitrate bus access requests. In the data processing system, the plurality of bus masters each include a priority generating circuit for generating the priority information, and each priority generating circuit ups the level of the priority information when a bus access request from the corresponding bus master is unaccepted.

According to the data processing system, when a bus access request from a bus master was not accepted, the priority generating circuit in that bus master ups the level of the priority information. Priorities of rejected bus masters are thus enhanced so that requests from bus masters with low priorities will not be left unaccepted. This allows still fairer arbitration and ensures still fairer bus access.

A third aspect of the invention is intended for a data processing system having an arbitration circuit that receives multiple pieces of priority information outputted respectively from a plurality of bus masters connected through a shared bus, so as to arbitrate bus access requests. In the data processing system, the plurality of bus masters each include a priority generating circuit for generating the priority information, and when an operating frequency of a bus master has been changed, the corresponding priority generating circuit outputs one of pieces of priority information that correspond respectively to a plurality of operating frequencies.

According to the data processing system, when the operating frequency of a bus master has been changed, the priority generating circuit outputs a corresponding one of pieces of priority predetermined information. Most suitable priority information can thus be obtained in correspondence with the operating frequency of the bus master.

A fourth aspect of the invention is intended for a data processing system having an arbitration circuit that receives multiple pieces of priority information outputted respectively from a plurality of bus masters connected through a shared bus, so as to arbitrate bus access requests. In the data processing system, the plurality of bus masters each include a priority generating circuit for generating the priority information, and when a condition of a bus master has been changed, the corresponding priority generating circuit outputs one of pieces of priority predetermined information.

According to the data processing system, when the condition of a bus master has been changed, the priority generating circuit outputs a corresponding piece of priority information among pieces of priority information that correspond respectively to a plurality of conditions. Most suitable priority information can thus be obtained in correspondence with the condition of the bus master.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a block diagram showing the configuration of a modification of the priority generating circuit in the data processing system of the invention.

DESCRIPTION OF THE PREFERRED EMBODIMENTS

<Configuration of the Entire System>

Computer systems comprise a plurality of bus masters, including CPUs serving as bus masters, which are interconnected through a shared bus. In particular, multiprocessors recently developed have a plurality of processors, or a plurality of bus masters, that are connected through a shared bus. In such systems having a plurality of bus masters, arbitration circuits for arbitrating bus access requests play an important role.

Figure 1:
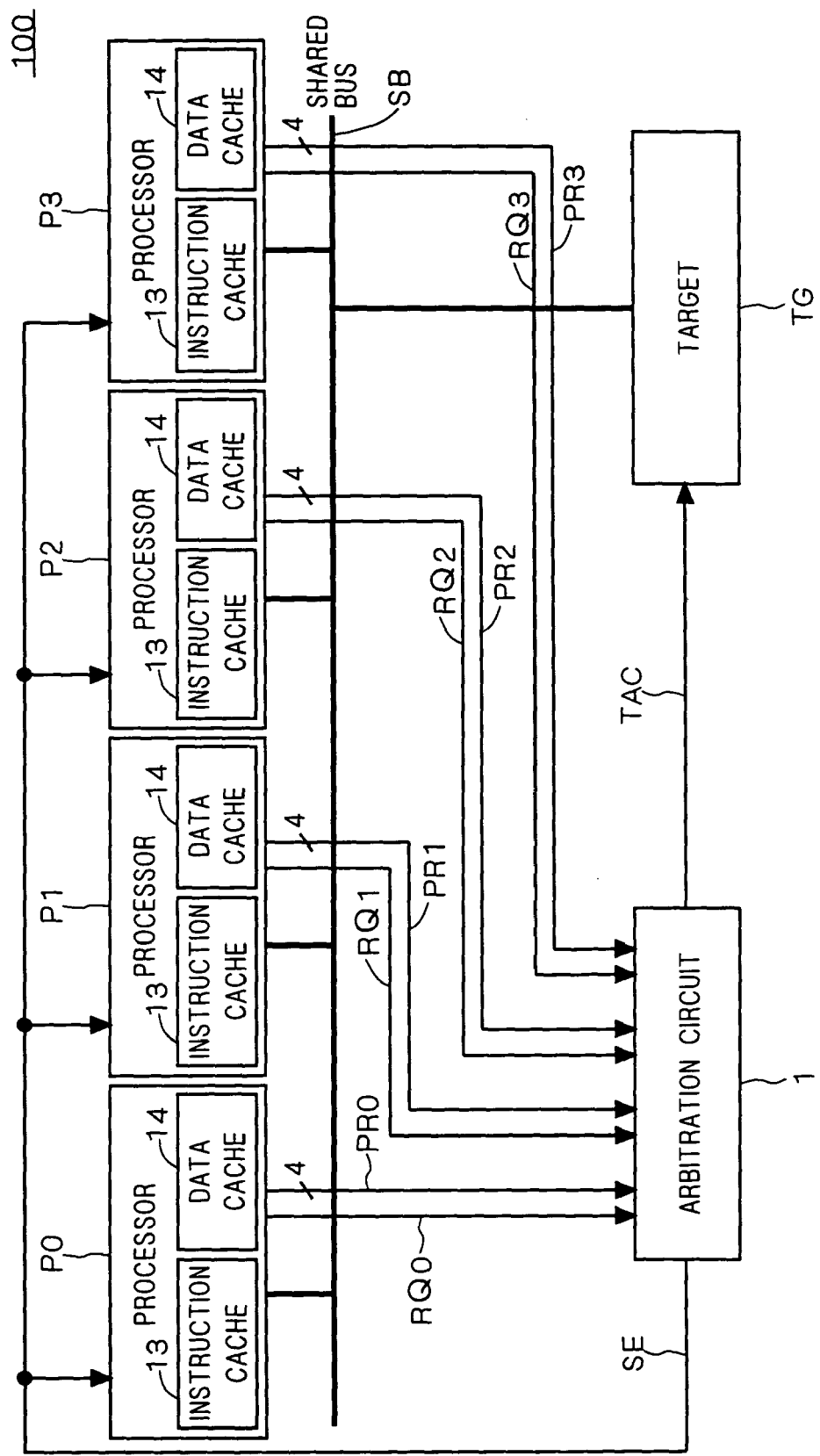
FIG. 1 is a block diagram showing the overall configuration of a data processing system according to the present invention.

First, referring to FIG. 1, the entire configuration of an exemplary data processing system is described to which the arbitration circuit of the invention is applied.

The data processing system 100 shown in FIG. 1 has four processors P0, P1, P2 and P3 as bus masters, where each processor is connected through a shared single bus SB to an accessed component TG (referred to as a target hereinafter), such as a memory.

The processors P0 to P3 respectively output requests RQ0, RQ1, RQ2 and RQ3, and the bus access requests RQ0 to RQ3 are sent to an arbitration circuit 1.

The processors P0 to P3 also provide outputs of priority information PR0, PR1, PR2 and PR3, which, too, are sent to the arbitration circuit 1. When bus access requests from processors are congested, the arbitration circuit 1 performs an arbitration process according to a scheme combining an order of priority based on round robin control and an order of priority based on the priority information PR0 to PR3 from the processors. The arbitration circuit 1 then outputs a processor selecting signal SE to allow a processor to use the bus.

Then the request from the processor allowed to use the bus is sent as a target access request TAC from the arbitration circuit 1 to the target TG and then it is processed in the target. The processed results are sent back to the processor.

The present invention is applied to the arbitration circuit 1 to ensure fair bus access.

<A. First Preferred Embodiment>

The configuration and operation of the above-described arbitration circuit 1 are now described as a first preferred embodiment of the invention.

<A-1. Configuration of the Device>

<A-1-1. Configuration of Processors>

Figure 2:
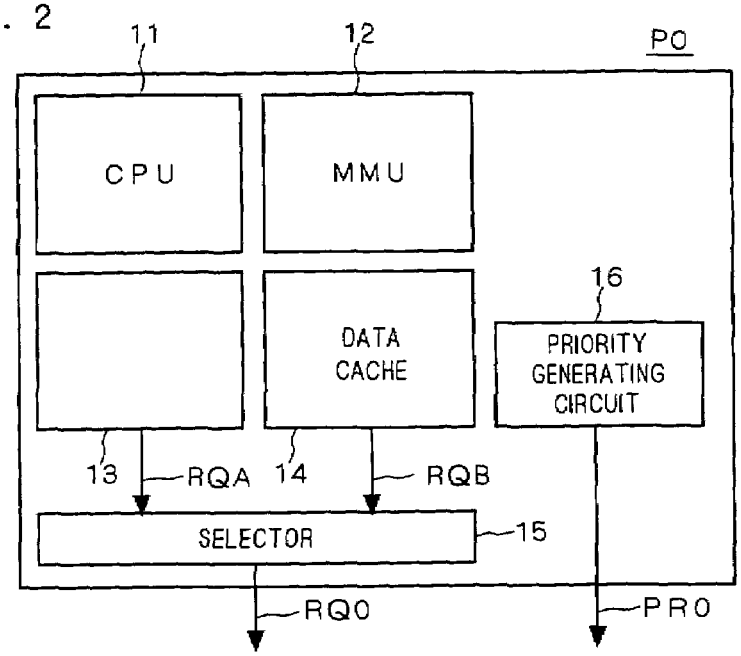
FIG. 2 is a block diagram showing a configuration in a processor.

First, an exemplary configuration of the processors P0 to P3 shown in FIG. 1 is described referring to FIG. 2. The processors P0 to P3 have the same configuration and FIG. 2 shows the processor P0 by way of example.

As shown in FIG. 2, the processor P0 includes a CPU (Central Processing Unit) 11, a MMU (Memory Management Unit) 12, an instruction cache 13, and a data cache 14. A selector 15 selects one of requests RQA and RQB from the instruction cache 13 and the data cache 14 and outputs the selected one as the request RQ0.

The processor P0 also includes a priority generating circuit 16. The priority generating circuit 16 generates a priority value, which is outputted as the priority information PR0 together with the bus access request. The priority generating circuit 16 generates an adequate priority value according to the priority level of the processor on the basis of, e.g. predetermined software.

Figure 3:
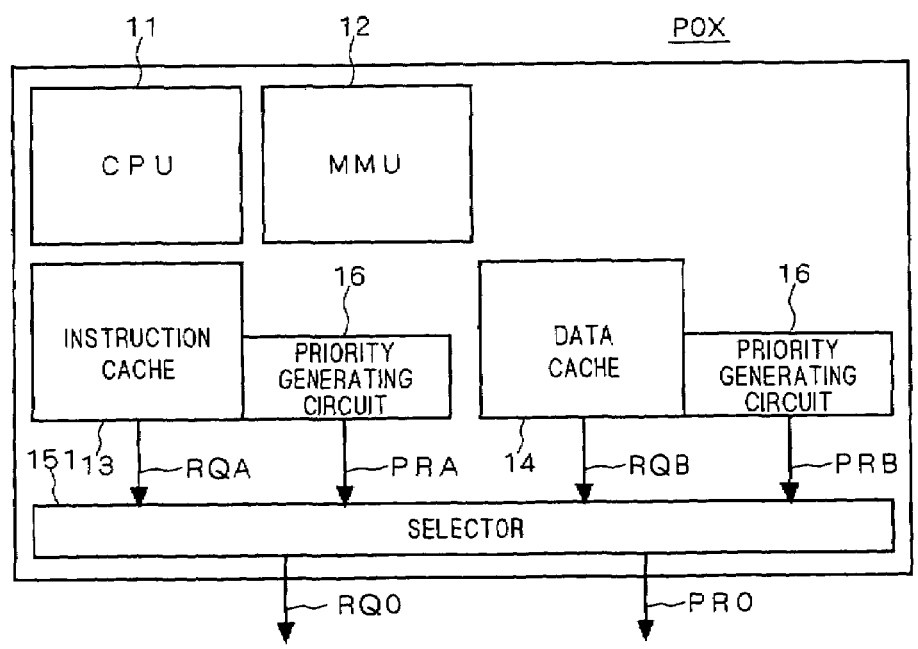
FIG. 3 is a block diagram showing a configuration in a processor.

While the processor P0 of FIG. 2 has a single priority generating circuit 16, the instruction cache 13 and the data cache 14 may be provided with respective priority generating circuits 16 as shown in the processor POX in FIG. 3.

That is to say, priority information pieces PRA and PRB may be separately provided in correspondence with the request (e.g. instruction fetch) RQA from the instruction cache 13 and the request (e.g. data access) RQB from the data cache 14. In this case, when selecting one of the requests, the selector 151 compares the priority information pieces PRA and PRB and selects a request having a higher priority, so as to output the request RQ0 and priority information PR0.

<A-1-2. Configuration of Arbitration Circuit>

Figure 4:
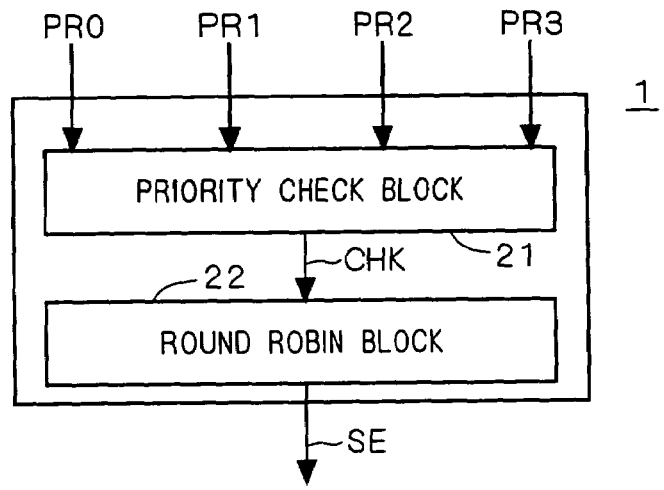
FIG. 4 is a block diagram showing the configuration of the arbitration circuit of the invention.
Figure 5:
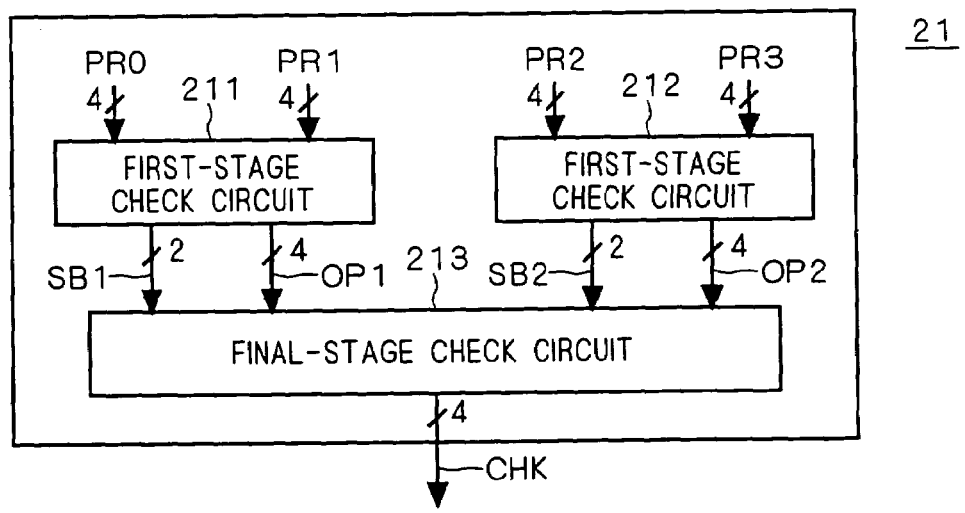
FIG. 5 is a diagram showing the configuration of the priority check block in the arbitration circuit of the invention.
Figure 6:
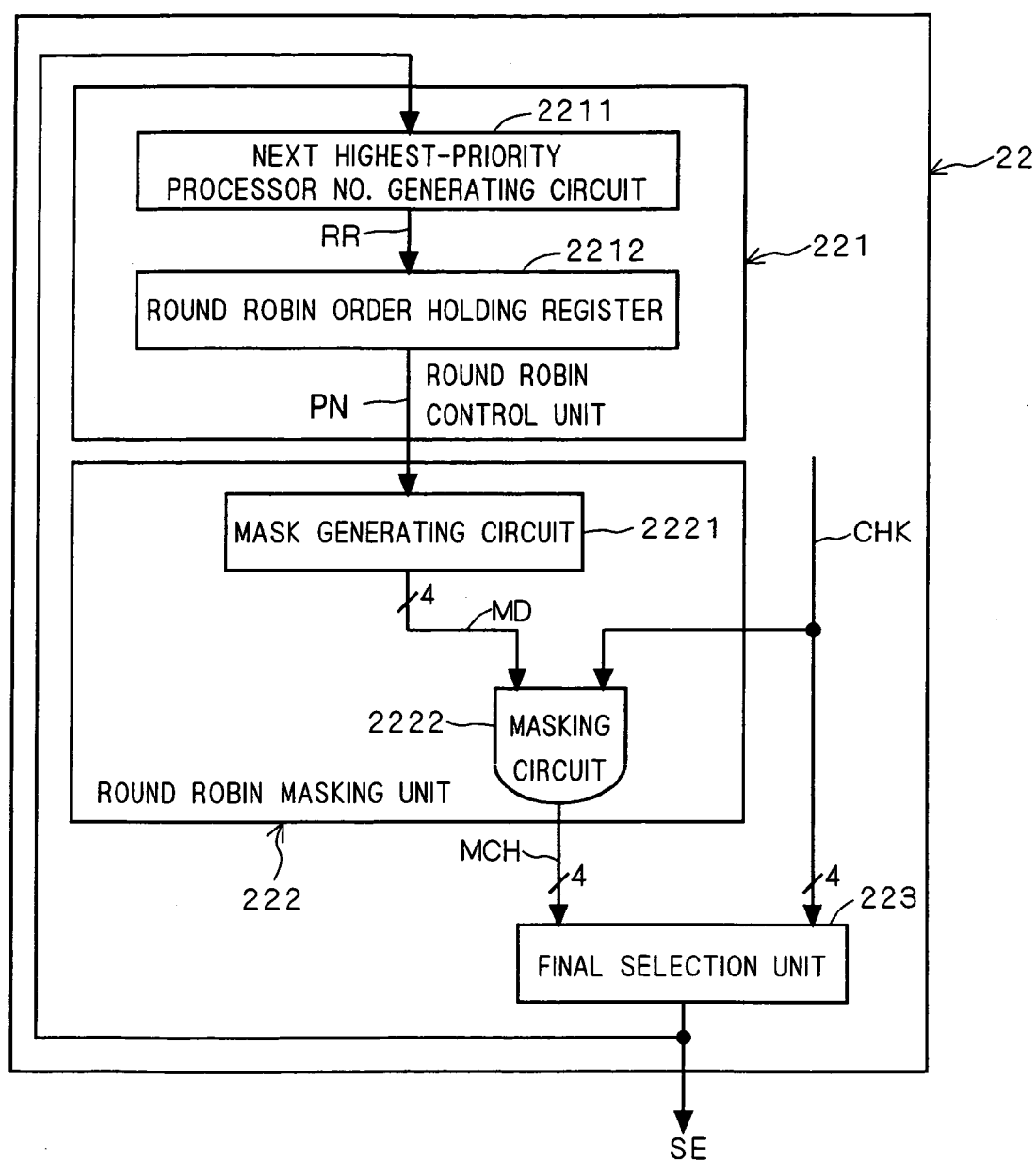
FIG. 6 is a diagram showing the configuration of the round robin block in the arbitration circuit of the invention.

Next, the configuration of the arbitration circuit 1 is described referring to FIGS. 4 to 6.

FIG. 4 is a block diagram showing the configuration of the arbitration circuit 1. As shown in FIG. 4, the arbitration circuit 1 includes a priority check block 21 and a round robin block 22.

The priority check block 21 checks pieces of priority information provided from processors to see which processor is outputting the highest-priority information, i.e. to see which is the processor of highest priority, and outputs the result of the check (CHK) to the round robin block 22.

The round robin block 22, holding the results of the previous arbitration process, generates and outputs the processor selecting signal SE on the basis of the priority check result CHK and a round robin order generated from the previous results.

<A-1-2-1. Priority Check Block>

Next, the configuration of the priority check block 21 is described referring to FIG. 5.

As shown in FIG. 5, the priority check block 21 compares the priority levels in the form of a tournament to output the final check result. The priority check block 21 includes first-stage check circuits 211 and 212 and a final-stage check circuit 213 that receives and compares outputs from the first-stage check circuits 211 and 212.

The first-stage check circuit 211 receives 4-bit priority information PR0 and 4-bit priority information PR1 and outputs the result of a priority check as 2-bit select bits SB1 and 4-bit output priority OP1. The first-stage check circuit 212 receives 4-bit priority information PR2 and 4-bit priority information PR3 and outputs the result of comparison as 2-bit select bits SB2 and 4-bit output priority OP2.

The select bits SB1 and SB2 and the output priorities OP1 and OP2 are given to the next-stage, i.e., final-stage check circuit 213. The final-stage check circuit 213 compares them to output 4-bit priority check result CHK.

The circuit configuration of the priority check block 21 of FIG. 5 can be adapted for various numbers of processors by simply increasing or decreasing the number of check circuits. For example, when the number of processors is doubled, i.e. when eight processors are provided, then the circuit configuration can be adapted by adding two first-stage check circuits and providing new check circuits for checking the outputs from the first-stage check circuits between the first-stage check circuits and the final-stage check circuit.

In this case, while the number of processors is doubled, the number of check circuit stages is increased just by one. Thus the delay time in the priority check block does not increase in proportion to the number of processors.

The operation of the priority check block 21 is described more specifically. It is assumed that the priority information from the processor P0 is taken as Priority (0) (hereinafter, the priority information is referred to as a priority value since it is represented by a number) and the priority value from the processor P1 is taken as Priority (1). When it is defined that smaller priority values indicate higher priority levels, then the first-stage check circuit 211 provides outputs as shown in Table 1. The first-stage check circuit 212 provides the results of comparison between processor P2 and P3 in the same manner.

TABLE 1

| Request 0 | Request 1 | Priority value comparison | Select bits | Output priority |
|---|---|---|---|---|
| 0 | 0 | Don't care | 2b00 | |
| 1 | 0 | Don't care | 2b10 | Priority (0) |
| 0 | 1 | Don't care | 2b01 | Priority (1) |
| 1 | 1 | Priority(0)> Priority (1) | 2b01 | Priority (1) |
| 1 | 1 | Priority(0)= Priority (1) | 2b11 | Priority (0) or (1) |
| 1 | 1 | Priority(0)< Priority (1) | 2b10 | Priority (0) |

The operation of the first-stage check circuit 211 is now described referring to Table 1. The request 0 and request 1, each formed of one bit, respectively indicate whether the processors P0 and P1 are presenting a bus access request, where "0" indicates the absence of a bus access request and "1" indicates the presence of a bus access request.

In the column of priority value comparison, "Don't care" means that the first-stage check circuit is not required to compare priority values when none of the processors are issuing a bus access request and when only one processor is issuing a bus access request.

That is to say, when none of the processors are issuing a bus access request, comparison has no meaning. When only one of the processors is issuing a bus access request, the processor issuing the bus access request can be selected unconditionally.

When both processors are issuing respective bus access requests, then the priority values must be compared.

Now, the results of comparison include three patterns: Priority (0) is larger than Priority (1); Priority (0) is equal to Priority (1); and Priority (0) is smaller than Priority (1).

Then the 2-bit select bits are determined on the basis of the result of the priority value comparison.

That is to say, when one of the processors is issuing a request, the bit assigned to that processor is set to 1 and the bit for the other processor is set to 0. When both processors are issuing a request, the select bits depend on the result of the priority value comparison.

Specifically, when none of the processors are issuing a bus access request, "00" is outputted as the select bits. The representation "2b00" in Table 1 shows that the signal is of 2 bits.

When only the processor P0 is issuing a bus access request, "10" is outputted as the select bits; when only the processor P1 is issuing a bus access request, "01" is outputted as the select bits.

When both processors are issuing respective bus access requests and Priority (0) is larger than Priority (1), i.e., the processor P1 has a higher priority level than the processor P0, then "01" is outputted as the select bits. When Priority (0) and Priority (1) are equal, then "11" is outputted as the select bits. When Priority (0) is smaller than Priority (1), then "10" is outputted as the select bits.

While the priority value of the selected processor is outputted as 4-bit output priority together with the select bits, the output priority can take any value when the select bits are "00." When only one of the processors is issuing a request, the priority value of that processor is provided as the output. When both processors are issuing a request, the first-stage check circuit outputs the priority value of the processor with a higher priority level, i.e., herein, the processor having a smaller priority value, on the basis of the priority value comparison; when the two priority values are equal, either of them may be outputted.

The final-stage check circuit 213 receives the select bits SB1 and SB2 from the first-stage check circuits 211 and 212 and outputs the priority check result CHK in correspondence with the final result of the priority level comparison among the four processors.

Now, when the output priorities from the first-stage check circuits 211 and 212 are taken respectively as Priority (01) and Priority (23) and the select bits outputted from the first-stage check circuits 211 and 212 are taken respectively as Selb (01) and Selb (23), then the final-stage check circuit 213 provides its output as shown in Table 2 below.

TABLE 2

| Selb (01) | Selb (23) | Priority value comparison | Final check result |
|---|---|---|---|
| 2b00 | 2b00 | Don't care | 4b0000 |
| 2b00 | not 2b00 | Don't care | {2b00,Selb(23)} |
| not 2b00 | 2b00 | Don't care | {Selb(01),2b00} |
| not 2b00 | not 2b00 | Priority(01)>Priority (23) | {2b00, Selb(23)} |
| not 2b00 | not 2b00 | Priority(01)=Priority (23) | {Selb(01), Selb(23)} |
| not 2b00 | not 2b00 | Priority(01)<Priority(23) | {Selb(01),2b00} |

Now, the operation of the final-stage check circuit 213 is described referring to Table 2. First, the final-stage check circuit 213 compares the select bits outputted from the first-stage check circuits 211 and 212, rather than the bus access requests at the first-stage check circuits 211 and 212.

When the select bits Selb(01) and Selb(23) are both "00," then the priority value comparing process is not needed and the final-stage check circuit 213 outputs "0000" as the final check result. The representation "4b0000" in Table 2 shows that the signal is of 4 bits.

The priority value comparing process is not needed also when only one set of the select bits Selb(01) and Selb(23) is "00," in which case the final-stage check circuit 213 outputs as the final check result a 4-bit value in which the values of the select bits Selb(01) and Selb(23) are arranged in this order.

For example, only the select bits Selb(01) are "00," then it outputs "2b00, Selb(23)." The representation "2b00, Selb (23)" shows a 4-bit value whose high-order two bits are "00" and low-order 2 bits are "Selb(23)."

The comparing process is essential when neither of the select bits Selb(01) and Selb(23) are "00," in which case the respective priority values are compared.

The results of comparison include three patterns: Priority (01) is larger than Priority (23); Priority (01) is equal to Priority (23); and Priority (01) is smaller than Priority (23).

Then the final check result is outputted as a 4-bit value on the basis of the priority value comparison, where the values of select bits Selb(01) and Selb(23) are arranged in this order. In this case, the higher-priority select bits, i.e. select bits having a smaller priority value, are outputted intactly, but the select bits having a larger priority value are outputted as "00."

More specifically, when Priority (01) is larger than Priority (23), the final check result is "2b00, Selb(23)"; when Priority (01) is smaller than Priority (23), then the final check result is "Selb(01), 2b00."

When Priority (01) and Priority (23) are equal, both sets of select bits are outputted as "Selb(01), Selb(23)."

<A-1-2-2. Round Robin Block>

Next, the configuration of the round robin block 22 is described referring to FIG. 6.

As shown in FIG. 6, the round robin block 22 includes a round robin control unit 221, a round robin masking unit 222, and a final selection unit 223.

The round robin control unit 221 includes a highest-priority processor number generating circuit 2211 and a round robin order holding register 2212. On the basis of the results of the previous arbitration process, the highest-priority processor number generating circuit 2211 generates a round robin order RR including a new highest-priority processor number PN, which is held in the round robin order holding register 2212. The round robin order holding register 2212 outputs the highest-priority processor number PN in accordance with timing of the arbitrating process.

The highest-priority processor number generating circuit 2211 operates so that the lowest access priority is assigned to the processor that gained bus access in the previous arbitration process.

The round robin masking unit 222 includes a mask generating circuit 2221 and a masking circuit 2222. The mask generating circuit 2221 receives the highest-priority processor number PN outputted from the round robin control unit 221 and generates mask data MD for masking given data. The masking circuit 2222 receives the mask data MD from the mask generating circuit 2221 and the priority check result CHK outputted from the priority check block 21 and performs AND operation to mask the priority check result, so as to output a 4-bit masked check result MCH.

The mask data MD is 4-bit data whose highest-order bit is assigned to the processor P0 and the remaining three bits are assigned to the processors P1, P2 and P3 in this order. The mask data MD is generated so that the bit assigned to the highest-priority processor number and the following bit(s) are all set to "1," so as not to mask the priority data about the highest-priority processor and the processor(s) assigned to the following bit(s), and so that the bit(s) that precede the bit assigned to the highest-priority processor number are all set to "0," so as to mask the priority data about the processor(s) assigned to the bit(s) preceding the highest-priority processor bit.

Table 3 below shows a list of highest-priority processor numbers and the corresponding mask data MD.

TABLE 3

| Highest-priority processor No. | Mask data |
|---|---|
| Processor P0 | 4b1111 |
| Processor P1 | 4b0111 |
| Processor P2 | 4b0011 |
| Processor P3 | 4b0001 |

As shown in Table 3, when the highest-priority processor is the processor P0, all bits including the highest-order bit are set to "1" (i.e. the priority data about all processors is kept unmasked) since the highest-order bit corresponds to the processor P0. In this case the mask data MD is provided as "1111." Similarly, when the highest-priority processor is the processor P1, the mask data MD is provided as "0111" (i.e. only the priority data about the processor P0 is masked). When the highest-priority processor is the processor P2, then the mask data MD is provided as "0011" (i.e. only the priority data about the processors P0 and P1 is masked), and when the highest-priority processor is the processor P3, then the mask data MD is provided as "0001" (i.e. the priority data about the processors P0 to P2 is masked).

Suppose the round robin control unit 221 indicates that the highest-priority processor is the processor P2 and the priority check block 21 has determined that the processors P0 and P3 are presenting the same highest-priority values. Then the masking circuit 2222 receives "0011" as the mask data MD and receives "1001" as the priority check result CHK.

Then the masking circuit 2222 conducts an AND operation to provide "0001" as the masked check result MCH.

The masked check result MCH outputted from the masking circuit 2222 and the priority check result CHK outputted from the priority check block 21 are provided to the final selection unit 223.

The masked check result MCH is provided as the high-order 4 bits of the input to the final selection unit 223 and the priority check result CHK is provided as the low-order 4 bits of the input.

The final selection unit 223 is formed of a priority encoder, for example. It searches the input data from the highest-order position to find the position where "1" appears first. From this position, the final selection unit 223 obtains the number of the processor whose request should be accepted.

That is to say, the 4-bit masked check result MCH and the 4-bit priority check result are arranged in this order, with the highest-order bit assigned to the processor P0 and the following bits assigned to the processors P1, P2 and P3 in order, and with the fifth bit assigned again to the processor P0 and the following bits assigned to the processors P1, P2 and P3. Then the processor of the number assigned to the bit position where "1" first appears corresponds to the processor whose request should be accepted, i.e. the processor is granted the bus access.

For example, when the processor P1 has the highest priority, the priority check result CHK is "0100," and the round robin order is P2, P3, P0, P1, then the mask data MD is "0011" (the third bit assigned to the processor P2 and the following bit are both set to "1"). Then the masking circuit 2222 ANDs the mask data MD and the priority check result CHK to obtain "0000" as the masked check result MCH.

Accordingly the input to the final selection unit 223 is 0000_0100 (the high-order 4 bits correspond to the masked check result and the low-order 4 bits correspond to the priority check result CHK).

As for the result encoded in the final selection unit 223, the first "1" is detected in the sixth bit position and the processor P1 is determined to be the processor whose request is accepted.

When the arbitration circuit 1 has accepted the request, it outputs the target access request TAC to the target TG. The processor selected with the processor selecting signal SE outputs the contents of the request onto the shared bus SB. The target TG receives the data carried on the shared bus SB while the target access request TAC is being asserted, and it processes the data and sends the results to the processor through the shared bus SB.

<A-2. Operation of the Device>

Figure 7:
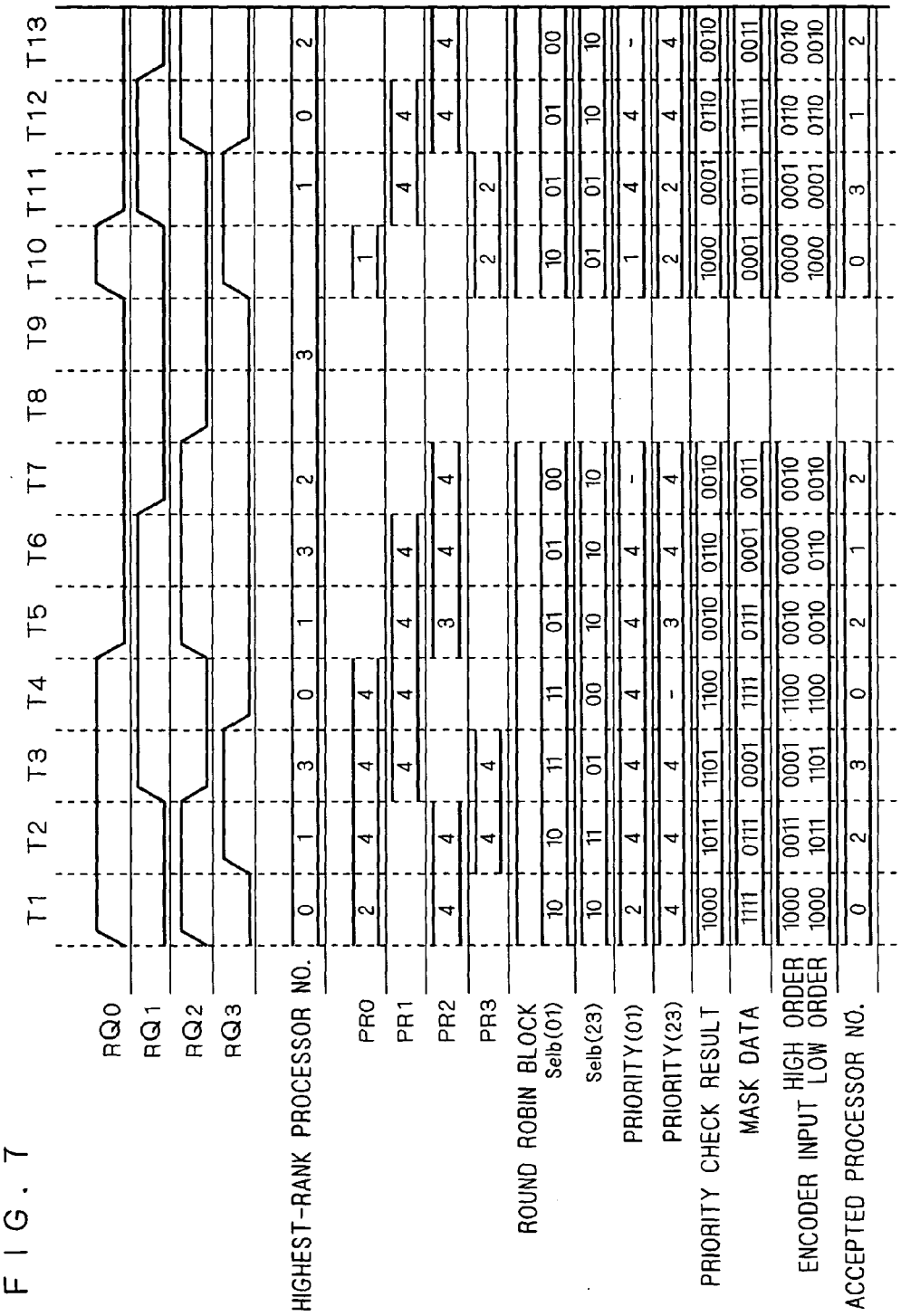
FIG. 7 is a timing chart used to describe the operation of the arbitration circuit of the invention.

FIG. 7 is a timing chart showing the entirety of the arbitrating operation described above. Some typical examples teaching how to read the timing chart are now described referring to FIGS. 4 to 6.

Requests RQ0 to RQ3 in FIG. 7 show that bus access requests are being presented when the signal pulses are high. Highest-rank processor number shows the number of a processor that is ranked highest among the processors P0 to P3, which is shown with numerals 0 to 3 for the sake of simplicity. When the highest rank is assigned to the processor P0, the processors P1, P2 and P3 are ranked in this order, and when the highest rank is assigned to the processor P3, the processors P0, P1 and P2 are ranked in this order. Thus the rankings are made according to so-called round robin control and therefore called as a round robin order.

While the priority values for the priority information PR0, PR1, PR2 and PR3 can take 16 values from 0 to 15, it is assumed herein that the processors use values 1 to 4.

The accepted processor number shows the number of a processor whose bus access request should be accepted as the final result of the arbitration by the arbitration circuit 1, which is shown with numerals 0 to 3 for the sake of simplicity.

In the period T1 shown in FIG. 7, only the processors P0 and P2 are presenting a bus access request, and the round robin order is 0, 1, 2, 3, so that the mask generating circuit 2221 of FIG. 6 outputs mask data "1111."

The processor P0 has a priority value of 2 (Priority(0)=2) and the processor P2 has a priority value of 4 (Priority(2)=4).

In this case, the first-stage check circuit 211 in the priority check block 21 of FIG. 5 provides "10" as the select bits Selb (01) as the result of a comparison between the processors P0 and P1 and the first-stage check circuit 212 provides "10" as the select bits Selb (23) as the result of a comparison between the processors P2 and P3.

Also, the first-stage check circuit 211 outputs "2" as the output priority (Priority(01)=2) and the first-stage check circuit 212 outputs "4" as the output priority (Priority(23)=4).

Accordingly the final-stage check circuit 213 provides "1000" as the priority check result and the round robin masking unit 2222 ANDs the mask data "1111" and the priority check result "1000" to provide masked check result "1000."

Then the masked check result "1000" from the masking circuit 2222 of FIG. 6 and the priority check result "1000" from the priority check block 21 are supplied to the final selection unit 223 respectively as the high-order 4 bits and low-order 4 bits in 8-bit data (1000_1000)

Then, the result encoded by the final selection unit 223 determines that the request from the processor P0 should be accepted.

In the period T2, the processors P0, P2 and P3 are presenting a bus access request. As for the round robin order, since the bus access from the processor P0 was accepted in the period T1, the highest-priority processor number generating circuit 2211 of FIG. 6 sets the round robin order as 1, 2, 3, 0 on the basis of round robin control, so that the mask generating circuit 2221 outputs mask data "0111."

The priority value of the processor P0 is 4 (Priority(0)=4), the priority value of the processor P2 is 4 (Priority(2)=4), and the priority value of the processor P3 is 4 (Priority(3)=4). When a plurality of masters thus have the same priority and there is no master with a higher priority, it can be said that there are a plurality of masters having the highest priority.

In this case, the first-stage check circuit 211 in the priority check block 21 provides "10" as the select bits Selb (01) from a comparison between the processors P0 and P1 and the first-stage check circuit 212 provides "11" as the select bits Selb (23) from a comparison between the processors P2 and P3, since the priority values of the processors P2 and P3 are equal.

The first-stage check circuit 211 also provides output priority of 4 (Priority(01)=4) and the first-stage check circuit 212 provides output priority of 4 (Priority(23)=4).

Accordingly, the final-stage check circuit 213 provides "1011" as the priority check result and the round robin masking unit 2222 ANDs the mask data "0111" and the priority check result "1011" to provide masked check result "0011."

Then the masked check result "0011" from the masking circuit 2222 and the priority check result "1011" from the priority check block 21 are provided to the final selection unit 223 respectively as the high-order 4 bits and low-order 4 bits in 8-bit data (0011_1011).

Then the final selection unit 223 encodes the data and determines that the request from the processor P2 should be accepted.

In the period T6, only the processors P1 and P2 are presenting a bus access request, and the round robin order is 3, 0, 1, 2, so that the mask generating circuit 2221 of FIG. 6 outputs mask data "0001."

The priority value of the processor P1 is 4 (Priority(1)=4) and the priority value of the processor P2 is 4 (Priority(2)=4).

Then the first-stage check circuit 211 in the priority check block 21 of FIG. 5 provides "01" as the select bits Selb (01) from a comparison between the processors P0 and P1 and the first-stage check circuit 212 provides "10" as the select bits Selb (23) from a comparison between the processors P2 and P3.

The first-stage check circuit 211 also provides output priority of 4 (Priority(01)=4) and the first-stage check circuit 212 provides output priority of 4 (Priority(23)=4).

Accordingly, the final-stage check circuit 213 provides "0110" as the priority check result and the round robin masking unit 2222 ANDs the mask data "0001" and the priority check result "0110" to provide "0000" as the masked check result.

Then the masked check result "0000" from the masking circuit 2222 of FIG. 6 and the priority check result "0110" from the priority check block 21 are provided to the final selection unit 223 respectively as the high-order 4 bits and low-order 4 bits in 8-bit data (0000_0110).

Then the final selection unit 223 encodes the data and determines that the request from the processor P1 should be accepted.

<A-3. Effects>

As described so far, the arbitration circuit of the first preferred embodiment of the invention combines priority arbitration and round robin arbitration. Thus, while preferentially giving the bus access right to a processor presenting a high-priority bus access request, the arbitration circuit generates mask data on the basis of a round robin order so that data at least about a processor with the highest priority is not masked, and then the mask data is used to mask the data resulting from the priority value check. Some of the processors with the highest priority are masked by a round robin arbitration, which provides arbitration that ensures fair bus access with a smaller circuit scale.

<B. Second Preferred Embodiment>

The first preferred embodiment has described the configuration and operation of the arbitration circuit 1 of FIG. 1 and the effect of ensuring fair bus access. A second preferred embodiment of the invention describes a configuration that can ensure still fairer bus access.

<B-1. Configuration of the Device>

In FIG. 2 or FIG. 3, each of the processors P0 to P3 includes its own priority generating circuit 16, where a priority value generated in the priority generating circuit 16 is outputted as priority information together with a bus access request. Now, FIG. 8 shows the configuration of a priority generating circuit 16A; in addition to the function of the priority generating circuit 16, the priority generating circuit 16A is further provided with a function of upping the rank of the priority value when bus access was not accepted.

Figure 8:
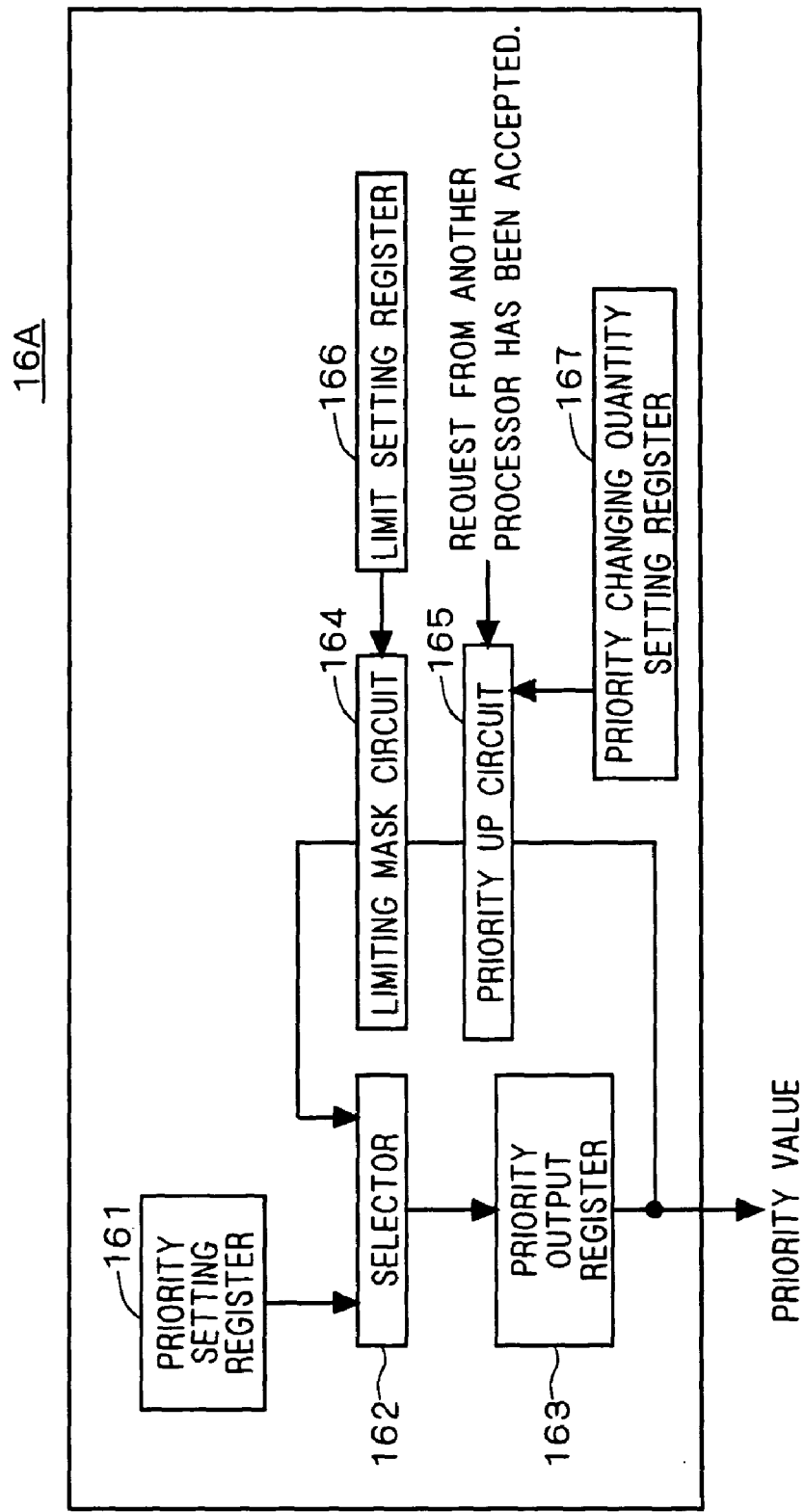
FIG. 8 is a block diagram showing the configuration of a priority generating circuit in the data processing system of the invention.

As shown in FIG. 8, the priority generating circuit 16A includes a priority setting register 161, a selector 162, and a priority output register 163. The priority setting register 161 generates, on the basis of predetermined software, a priority value that corresponds to the priority level of the processor. The selector 162 gets the priority value generated by the priority setting register 161 and a new priority value described later and selects one of them. The priority output register 163 once holds the priority value selected by the selector 162 and externally outputs the priority value according to given timing. While the priority generating circuit 16 shown in FIG. 2 is composed of this priority setting register 161 and the priority output register 163, the priority generating circuit 16A is further provided with the components shown below.

That is to say, the priority generating circuit 16A further includes a priority up circuit 165 and a limiting mask circuit 164. When a request of the processor with a priority value provided as the output was not accepted, the priority up circuit 165 obtains this information and subtracts a given value, e.g. one, from the current priority value to set a new priority value, and the limiting mask circuit 164 limits the priority value set by the priority up circuit 165.

The new priority value is sent via the limiting mask circuit 164 to the selector 162, and the selector 162 selects the new priority value and gives it to the priority output register 163. When a request from the processor was accepted and a new, next request is issued, the value from the priority setting register 161 is selected and given to the priority output register 163.

A priority changing quantity setting register 167, for setting a quantity by which the priority value is varied, is attached to the priority up circuit 165. The priority changing quantity setting register 167 sets a value that is subtracted from the current priority value. While this value was assumed to be "1" in the description above, this value can be varied to another value, e.g. 2 or 3. When the priority changing quantity setting register 167 is set to "0," then the priority is not upped and the priority generating circuit 16A operates in the same way as the priority generating circuit 16 of the first preferred embodiment.

It has been assumed so far herein that smaller priority values indicate higher priority levels. However, when larger priority values indicate higher priority levels, the priority up circuit 165 adds a given value to the current priority value and the priority changing quantity setting register 167 sets this value to be added to.

Furthermore, a limit setting register 166 is connected to the limiting mask circuit 164; the limit value at the limiting mask circuit 164 is set by the limit setting register 166. For example, the priority up circuit 165 reduces one from the value of the priority output register 163 each time a bus access request from another processor is accepted. However, when this value becomes a value below a limit value set by the limit setting register 166, then the value to the selector 162 is varied to the limit value.

In the processor of FIG. 2, the CPU 11 sets the limit setting register 166 to define the highest priority level this processor can take.

For example, suppose the priority setting register has set an initial priority value of 5 and the limit setting register 166 sets a minimum limit value of 2. Then, while the priority value is 5 at the beginning, the priority value is decreased to 4, 3 each time the bus access request is rejected. However, since the minimum limit value is 2, the priority value is not decreased below 2, i.e. the priority is not enhanced any more.

For example, when the minimum limit value for the processor P0 is set at 0 and the minimum limit values for other processors are set at 2, then bus access requests from the processor P0 take precedence over others since priority values from the remaining processors can reach only to 2.

<B-2. Operation of the Device>

Figure 9:
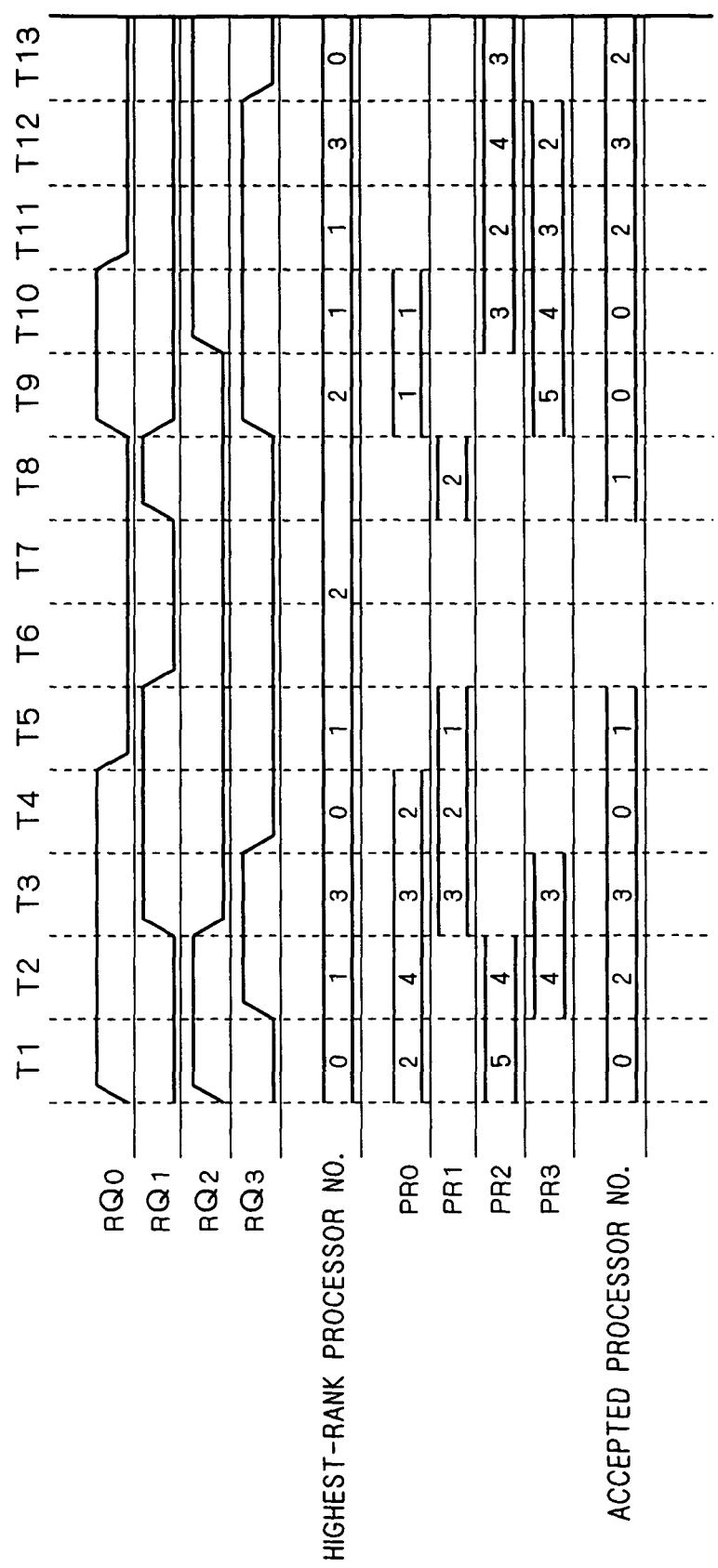
FIG. 9 is a timing chart used to describe the operation of the priority generating circuit in the data processing system of the invention.

FIG. 9 is a timing chart showing the entire arbitration operation by the arbitration circuit 1 shown in FIG. 1, including the operation of stepping up the priority level as described above.

FIG. 9 is basically the same as FIG. 7 and the same conditions and names of data are not described here again. Also, specific contents of the arbitration are the same as those described in the first preferred embodiment, so that the various check results etc. are not shown again.

In the period T1 in FIG. 9, only the processors P0 and P2 are presenting a bus access request and the round robin order is 0, 1, 2, 3. The priority value from the processor P0 is 2 (Priority(0)=2) and the priority value from the processor P2 is 5 (Priority(2)=5).

In this case, arbitration by the arbitration circuit 1 determines that the processor P0 is to be accepted.

In the period T2, the processors P0, P2, and P3 are presenting a bus access request and the round robin order is 1, 2, 3, 0. The priority value from the processor P0 is 4 (Priority(0)=4) and the priority value from the processor P3 is 4 (Priority(3)=4), and the priority value from the processor P2, whose bus access request was rejected last time, has been upped to 4 (Priority(2)=4).

In this case, the arbitration by the arbitration circuit 1 determines that the processor P2 is to be accepted.

In the period T3, the processors P0, P1, and P3 are presenting a bus access request and the round robin order is 3, 0, 1, 2. The priority value from the processor P1 is 3 (Priority(1)=3) and the priority values from the processors P0 and P3, whose bus access requests were rejected last time, have been upped to 3 (Priority(0)=3 and Priority(3)=3).

In this case, the arbitration by the arbitration circuit 1 determines that the processor P3 is to be accepted.

In the period T4, only the processors P0 and P1 are presenting a bus access request and the round robin order is 0, 1, 2, 3. The priority values from the processors P0 and P1, whose bus access requests were rejected last time, have been upped to 2 (Priority(0)=2 and Priority(1)=2).

In this case, the arbitration by the arbitration circuit 1 determines that the processor P0 is to be accepted.

<B-3. Effects>

As described so far, the priority generating circuits 16A included in the processors P0 to P3 have the function of upping the level of the priority values step by step when a bus access request has been rejected. Priorities of rejected processors are thus enhanced so that requests from processors with lower priority levels will not be left unaccepted. This enables still fairer arbitration and ensures still fairer bus access.

<B-4. Modifications>

The second preferred embodiment has shown a configuration in which the priority generating circuits in the processors P0 to P3 have the function of stepping up the level of priority values when bus accesses are not accepted. The configuration for varying the priority values may be structured as shown in the first to third modifications below.

<B-4-1. First Modification>

Figure 10:
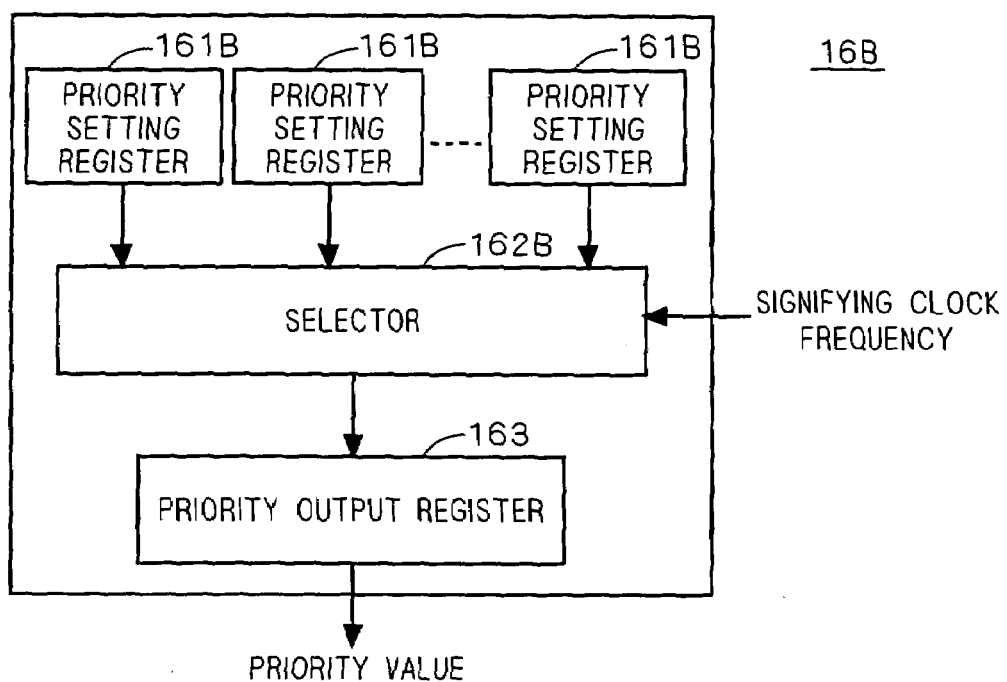
FIG. 10 is a block diagram showing the configuration of a modification of the priority generating circuit in the data processing system of the invention.

FIG. 10 shows the configuration of a priority generating circuit 16B. The priority generating circuit 16B of FIG. 10 includes: a plurality of priority setting registers 161B; a selector 162B for selecting one of the priority values outputted from the plurality of priority setting registers 161B; and a priority output register 163 for once holding the priority value selected by the selector 162B and externally outputting the value according to given timing.

Different priority values are set in the individual priority setting registers 161B to deal with variations of the operating frequency of the processor.

That is to say, the operating frequency for the CPU that defines the operating frequency of the processor can be varied by varying the frequency of a clock signal applied to the processor. For example, it can be varied step by step by multiplying the reference clock by 2, 3, 4 or by dividing the reference clock by 2, 3, 4.

Thus, in advance, priority values corresponding to various operating frequencies are set respectively in the plurality of priority setting registers 161B. When the operating frequency of the processor has been changed, the selector 162B performs a selecting operation on the basis of the clock signal frequency applied to the processor, thereby providing the corresponding priority value. Thus a proper priority value can be outputted in accordance with the operating frequency.

For example, when the operating frequency of a processor is set low, the processor operates slowly. Such setting is made, e.g. for the purpose of reducing power consumption, when high-speed processing of the processor is not required. In such a case, the priority level of a bus access request from the processor does not have to be very high, so that the priority value can be set large.

On the other hand, when the operating frequency of the processor is set high, it is desirable to assign a high priority level to a bus access request from the processor. Therefore a smaller priority value is desirable.

Applying the priority generating circuit 16B provides more adequate priority values in correspondence with the operating frequencies of the processor.

That is to say, when a high priority is assigned to a processor whose operating speed is set low, then a meaningless contention arises among that processor and other processors operating at high speed, and then bus access from processors requiring high-speed operation may be prevented. The configuration shown above solves this problem.

<B-4-2. Second Modification>

Figure 11:
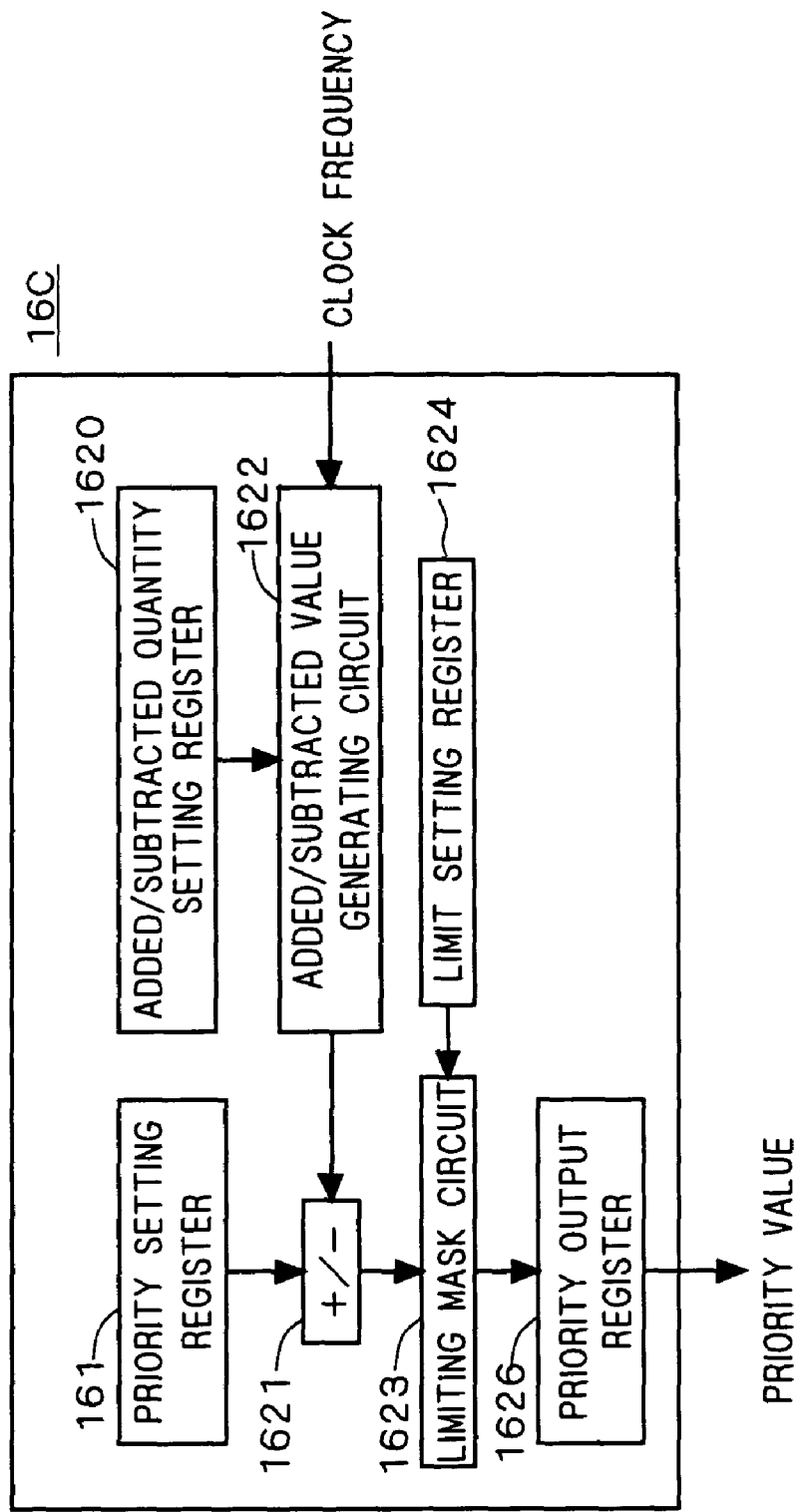
FIG. 11 is a block diagram showing the configuration of a modification of the priority generating circuit in the data processing system of the invention.

FIG. 11 shows the configuration of a priority generating circuit 16C. The priority generating circuit 16C of FIG. 11 is configured so that the priority value can be increased/decreased in accordance with the operating frequency value of the processor.

That is to say, the priority generating circuit 16C includes: a priority setting register 161 for generating a priority value corresponding to the priority level of the processor on the basis of predetermined software; an adding/subtracting circuit 1621 for adding/subtracting a given value to/from the priority value outputted from the priority setting register 161 to provide a priority output value; and a priority output register 1626 for once holding the priority output value from the adding/subtracting circuit 1621 and externally outputting the value according to given timing.

An added/subtracted value generating circuit 1622 is attached to the adding/subtracting circuit 1621; the added/subtracted value generating circuit 1622 sets a value to be added to or subtracted from the priority value in accordance with the frequency of the clock signal applied to the processor. The adding/subtracting circuit 1621 increases/decreases the priority value output from the priority setting register 161 by the added/subtracted value set by the added/subtracted value generating circuit 1622.

For example, when the operating frequency of a processor is set faster than a predetermined default value, the adding/subtracting circuit 1621 decrements the priority value outputted from the priority setting register 161 to up the priority. On the other hand, when the operating frequency of a processor is set slower than the predetermined default value, then the adding/subtracting circuit 1621 increments the priority value outputted from the priority setting register 161 to lower the priority. The added/subtracted value generating circuit 1622 can provide a greater increase/decrease as the processor operating frequency deviates further apart from the default value.

An added/subtracted quantity setting register 1620 is attached to the added/subtracted value generating circuit 1622; the added/subtracted quantity setting register 1620 previously holds quantities by which the priority value is increased/decreased.

Furthermore, a limiting mask circuit 1623 is interposed between the adding/subtracting circuit 1621 and the priority output register 1626. When the priority output value from the adding/subtracting circuit 1621 is increased over or decreased below a limit value at the limiting mask circuit 1623, i.e. a limit value set by the limit setting register 1624 (in this case, the minimum and maximum limit values), then the priority output value is varied to the minimum or maximum limit value.

For example, suppose the clock frequency is increased by multiplying the reference clock by 2, 3, 4 and decreased by dividing the reference clock by 2, 3, 4. In this case, when the default value corresponds to the reference clock, and the priority setting register 161 sets 4, the added/subtracted quantity setting register 1620 sets 2, and the limit setting register 1624 sets a minimum limit value 0 and a maximum limit value 15, then the priority generating circuit 16C provides the priority output value as shown in Table 4.

TABLE 4

| Frequency setting | Priority value variation | Output priority value |
|---|---|---|
| Multiplied by 4 | Priority setting register value − 8 | 0 |
| Multiplied by 3 | Priority setting register value − 4 | 0 |
| Multiplied by 2 | Priority setting register value − 2 | 2 |
| Reference (default) | Priority setting register value | 4 |
| Divided by 2 | Priority setting register value + 2 | 6 |
| Divided by 3 | Priority setting register value + 4 | 8 |
| Divided by 4 | Priority setting register value + 8 | 12 |

In Table 4, when the clock frequency is set at two times, three times, and four times that of the reference clock, then 2, 4 and 8 are respectively subtracted from the value that the priority setting register 161 sets when the clock frequency is equal to the reference value (i.e. 4). However, the priority output value is 0 even when the clock frequency is four times that of the reference clock, because the minimum limit value is 0.

When the clock frequency is set as the reference clock divided by 2, 3, 4, then 2, 4 and 8 are respectively added to the value that the priority setting register 161 sets when the clock frequency is equal to the reference value (i.e. 4). The priority output value is 12 when the reference clock is divided by 4, since the maximum limit value is 15.

The added/subtracted value generating circuit 1622 provides a greater increase/decrease as the processor operating frequency is deviated further apart from the default value.

As shown above, the priority value is dynamically varied in correspondence with variations of the processor operating frequency, so that more suitable priority values can be obtained in correspondence with the processor operating frequencies.

<B-4-3. Third Modification>

FIG. 12 shows the configuration of a priority generating circuit 16D. The priority generating circuit 16D of FIG. 12 includes: a plurality of priority setting registers 161B; a selector 162C for selecting one of the priority values outputted from the plurality of priority setting registers 161B; and a priority output register 163 for once holding the priority value selected by the selector 162C and externally outputting the value according to given timing.

The plurality of priority setting registers 161B hold different priority values so as to deal with different conditions of the CPU 11 (FIG. 2).

The conditions of the CPU 11 to be dealt with include: a condition in which the CPU 11 has detected a branch instruction and is presenting a request for fetching an instruction from the branch destination; a condition in which the instruction queue of the CPU is vacant; and a condition in which the store buffer of the CPU 11 is full and next data to be stored is waiting.

When the CPU 11 is presenting an instruction fetch request for a branch destination, an instruction from the branch destination, i.e. an instruction from the target TG of FIG. 1, should be obtained as soon as possible, in which case a higher priority is desired. When the instruction queue is vacant, the CPU 11 is waiting for the next instruction from the target TG, in which case a higher priority is desired as well. When the store buffer is full and the next data to be stored is waiting, the pipeline processing cannot proceed until the store processing is done, so that a higher priority is desired.

Accordingly, considering the above-described conditions of the CPU 11, priority values are previously set in the plurality of priority setting registers 161B in correspondence with the individual conditions. The selector 162C is connected to the CPU 11 so that it can obtain information about the condition of the CPU 11. Thus, when the condition of the CPU has changed, then the selector 162C performs a selecting operation on the basis of the new condition of the CPU 11 so that a priority value corresponding to the new condition is outputted. A more suitable priority value can thus be provided as the output in accordance with the condition of the CPU 11.

Adopting the priority generating circuit 16D provides more suitable priority values in correspondence with the conditions of the CPU 11.

Conditions of the CPU 11 to be dealt with further include, as well as the three conditions shown above, a condition in which the CPU 11 reads data that is immediately used. In such a case, too, a higher priority is desired and a priority value corresponding this condition is also set in a priority setting register 161B.

While the description above has shown a configuration in which a more suitable priority value is selected in accordance with the condition of the CPU 11, the priority value may be set in accordance with the condition of a cache in the processor.

For example, the data cache 14 (FIG. 2) may be in a condition called "write-through." The write-through condition is one of the operations in which, when the CPU 11 writes data in the cache 14, the contents rewritten in the cache 14 are always written also into the main memory (not shown) so as to keep data matching. This operation includes two steps; the CPU 11 writes data into the cache 14 and then the cache 14 writes data into the main memory.

In write-through, the cache 14 may write data into the main memory (i.e. the target TG of FIG. 1) when the bus is not occupied, in which case there is no need to set the priority very high. However, when it has failed to completely write data, i.e. when a write-through operation has failed, then the data must be immediately written again. Therefore a high priority is desired when data is written again in a writing back process. A priority value corresponding this condition is also set in a priority setting register 161B so that the data can be written again preferentially.

The description above assumed that the arbitration circuit 1 performs arbitration operation. However, the above-described priority generating circuits 16A to 16D may be applied in order to ensure fair bus access also to data processing systems having conventional arbitration circuits that perform round robin control only. It is also possible to configure priority generating circuits by combining the priority generating circuits 16A to 16D.

While the invention has been described in detail, the foregoing description is in all aspects illustrative and not restrictive. It is understood that numerous other modifications and variations can be devised without departing from the scope of the invention.

What is claimed is:

1. An arbitration circuit for arbitrating bus access requests presented from a plurality of bus masters connected through a shared bus, comprising:
   a priority check block configured to receive multiple pieces of priority information outputted respectively from said plurality of bus masters, for comparing said pieces of priority information and specifying masters with a highest priority so as to output a check result; and
   a round robin block,
   said round robin block comprising,
   a round robin control unit configured to determine, through a round robin algorithm, a priority order of the bus access requests from said plurality of bus masters,
   a round robin masking unit configured to mask data of said check result with mask data to output a masked check result, said mask data being generated on the basis of said priority order, and
   a final selection unit for selecting a bus master whose bus access request should be accepted on the basis of said masked check result and said check result, said masked check result and said check result being consecutive data.

2. The arbitration circuit according to claim 1, wherein said priority check block comprises:
   a plurality of first-stage check circuits each receiving two pieces of said priority information as a set, for comparing said two pieces of priority information and outputting a higher priority information as an output priority; and
   at least one next-stage check circuit receiving two, as a set, of said plurality of output priorities from said first-stage check circuits, for comparing said two output priorities and specifying masters with a highest priority.

3. The arbitration circuit according to claim 1, wherein said check result and said mask data are each multi-bit data in which individual bits are assigned respectively to said plurality of bus masters,
   said mask data masks a bit or bits of higher-order than a bit that is assigned to a master with a highest-priority order, and
   said round robin masking unit performs a logical operation with the data of said check result and said mask data to obtain said masked check result.

4. The arbitration circuit according to claim 3,
   wherein the data of said masked check result and the data of said check result are given to said final selection unit as consecutive data in which the data of said masked check result forms a high-order portion and the data of said check result forms a low-order portion, and
   said final selection unit searches said consecutive data from its highest-order position to find a bit position where a given logical value appears first, and determines the bus master assigned to that bit position as a bus master whose request should be accepted.

5. A data processing system having an arbitration circuit as recited in claim 1 that receives multiple pieces of priority information outputted respectively from a plurality of bus masters connected through a shared bus, so as to arbitrate bus access requests,
   wherein said plurality of bus masters each comprise a priority generating circuit for generating the priority information, and
   said plurality of priority generating circuits are each configured to up a level of priority information during a round of arbitration when a bus access request from the corresponding bus master is unaccepted during a previous round of arbitration.

6. The data processing system according to claim 5, wherein each said priority generating circuit comprises a priority up circuit for, when a bus access request was unaccepted with an outputted piece of priority information, adding or subtracting a given value to or from said outputted piece of priority information, so as to set a new piece of priority information.

7. The data processing system according to claim 6, wherein each said priority generating circuit further comprises a priority changing quantity setting register for setting said given value.

8. The data processing system according to claim 6, wherein each said priority generating circuit further comprises a limiting circuit for limiting the priority upping of said priority information.

9. A data processing system, comprising:
   an arbitration circuit configured to receive multiple pieces of priority information outputted respectively from a plurality of bus masters connected through a shared bus, so as to arbitrate bus access requests,
   wherein said plurality of bus masters each comprise a priority generating circuit for generating the priority information, and
   said priority generating circuit is configured to output one of pieces of priority information that correspond respectively to a plurality of processor operating frequencies.

10. The data processing system according to claim 9, wherein each said priority generating circuit comprises a plurality of priority setting registers in which the pieces of priority information corresponding to said plurality of operating frequencies are set in advance, and
    said priority generating circuit selects one of the values set in said plurality of priority setting registers and outputs the selected value as said priority information.

11. The data processing system according to claim 9, wherein said priority generating circuit comprises an adding/subtracting circuit for adding or subtracting a given value to or from reference priority information to set a new piece of priority information.

12. The data processing system according to claim 11, wherein said priority generating circuit further comprises a limiting circuit for limiting a maximum value and a minimum value of said new priority information.

13. A data processing device, comprising:
an arbitration circuit configured to receive multiple pieces of priority information outputted respectively from a plurality of bus masters connected through a shared bus, so as to arbitrate bus access requests,
wherein said plurality of bus masters each comprise a priority generating circuit for generating the priority information, said priority generating circuit comprising a plurality of priority information set in advance corresponding to each of a plurality of conditions of a corresponding bus master, and outputs an element of said plurality of priority information when a condition of said corresponding bus master changes, and
when a condition of a corresponding bus master is changed, said priority generating circuit outputs one of pieces of priority information that correspond respectively to a plurality of conditions.

14. The data processing system according to claim 13, wherein
each said priority generating circuit comprises a plurality of priority setting registers in which the pieces of priority information corresponding to said plurality of conditions are set in advance, and
when the condition of said bus master is changed, said priority generating circuit selects one of the values set in said plurality of priority setting registers and outputs the selected value as said priority information.

15. The data processing system according to claim 13, wherein said plurality of conditions comprise:
a condition in which a central processing unit in said bus master has detected a branch instruction and is presenting a request for fetching an instruction from a branch destination;
a condition in which an instruction queue for said central processing unit is vacant; and
a condition in which a store buffer in said central processing unit is full and data to be stored next is waiting.

* * * * *